(12) United States Patent
Ono et al.

(10) Patent No.: US 7,566,261 B2
(45) Date of Patent: Jul. 28, 2009

(54) AIR OUTLET DEVICE FOR VEHICLE CABIN

(75) Inventors: Michio Ono, Nagoya (JP); Masahiro Endou, Toyota (JP); Keiko Tanaka, Toyota (JP)

(73) Assignees: Howa Plastics Co., Ltd., Toyota-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 320 days.

(21) Appl. No.: 11/448,995

(22) Filed: Jun. 7, 2006

(65) Prior Publication Data

US 2007/0066206 A1 Mar. 22, 2007

(30) Foreign Application Priority Data

Aug. 24, 2005 (JP) ............................. 2005-242189

(51) Int. Cl.
*B60H 1/34* (2006.01)
*B60H 1/00* (2006.01)

(52) U.S. Cl. .......................... 454/155; 454/69; 454/143; 454/152

(58) Field of Classification Search .................. 454/69, 454/152, 153, 154, 155, 309, 315, 316, 318, 454/322, 143
See application file for complete search history.

(56) References Cited

U.S. PATENT DOCUMENTS

| | | | | |
|---|---|---|---|---|
| 3,274,916 A | * | 9/1966 | Waeldner et al. | 454/304 |
| 3,952,639 A | * | 4/1976 | Nobata | 454/316 |
| 4,664,022 A | * | 5/1987 | Oddenino | 454/155 |
| 4,735,131 A | * | 4/1988 | Matsuno | 454/315 |
| 4,840,113 A | * | 6/1989 | Freitag et al. | 454/155 |
| 5,080,002 A | * | 1/1992 | Soethout et al. | 454/154 |
| 6,176,775 B1 | * | 1/2001 | Volk | 454/154 |
| 6,589,110 B2 | * | 7/2003 | Tanabe et al. | 454/155 |

FOREIGN PATENT DOCUMENTS

| | | | |
|---|---|---|---|
| EP | 810112 A2 | * | 12/1997 |
| JP | 60234020 A | * | 11/1985 |
| JP | 2000-203254 A1 | | 7/2000 |
| JP | 2001-097035 A1 | | 4/2001 |
| JP | 2003-127658 A1 | | 5/2003 |
| JP | 2004-090830 A1 | | 3/2004 |

* cited by examiner

*Primary Examiner*—Steven B McAllister
*Assistant Examiner*—Patrick F. O'Reilly, III
(74) *Attorney, Agent, or Firm*—Burr & Brown

(57) ABSTRACT

In an air outlet device for a vehicle cabin, primary wind-direction adjustment plates are rotated between a parallel condition and a series condition, to thereby provide a wind distribution function of opening the outlet opening of a tubular body and adjusting the flow direction of air and a wind shutoff function of closing the outlet opening. Of the primary wind-direction adjustment plates, one primary wind-direction adjustment plate is configured such that its tip end edge gradually separates from an inner wall surface of the tubular body when the primary wind-direction adjustment plates are rotated so as to open the outlet opening. A secondary wind-direction adjustment plate is secured to the wind surface side of the primary wind-direction adjustment plate with a predetermined spacing formed therebetween. The secondary wind-direction adjustment plate rotates, together with the primary wind-direction adjustment plate, about the rotation center of the primary wind-direction adjustment plate.

3 Claims, 13 Drawing Sheets

AIR OUTLET DEVICE FOR VEHICLE CABIN

BACKGROUND OF THE INVENTION

1. Field of the Invention

The present invention relates to an air outlet device for a vehicle cabin (hereinafter referred to as "vehicle-cabin air outlet device"), for a center register, a side register, a lower register, a side defroster, or the like.

2. Description of the Related Art

Conventionally, there exists a vehicle-cabin air outlet device of a type which includes a tubular body which forms an air guide passage; a plurality of wind-direction adjustment plates (directional vanes) rotatably supported inside the tubular body and adapted to open and close an outlet opening at a front end of the tubular body; and a connection member which connects the wind-direction adjustment plates together and rotates them in an interlocked manner. The air outlet device has a wind distribution function of opening the outlet opening of the tubular body and adjusting the flow direction of blown air, and a wind shutoff function of closing the outlet opening of the tubular body to thereby stop the blowing of air. These functions are realized by rotating and adjusting the wind-direction adjustment plates between a parallel condition in which the plates become generally parallel to the axis of the tubular body and a serial condition in which the plates become generally perpendicular to the axis of the tubular body. A patent application has been filed for one form of such a vehicle-cabin air outlet device (see Japanese Patent Application Laid-Open (kokai) No. 2000-203254.

The vehicle-cabin air outlet device proposed in the patent application has three wind-direction adjustment plates, which are all connected with one another. Specifically, in the vehicle-cabin air outlet device, the wind-direction adjustment plates, which are rotatably supported inside a cylindrical tubular body, are connected with one another via a connection member, so that all the wind-direction adjustment plates rotate in an interlocked manner.

In the vehicle-cabin air outlet device, when the wind-direction adjustment plates are in the serial condition in which the plates become generally perpendicular to the axis of the tubular body, the wind-direction adjustment plates close an opening (the outlet opening) at the front end of the tubular body to thereby achieve the wind shutoff function. When a vehicle occupant pushes one of the wind-direction adjustment plates in this condition toward the interior of the tubular body, all the wind-direction adjustment plates rotate about respective rotation centers in an interlocked manner, and, at maximum rotation, rotate until the wind-direction adjustment plates enter the parallel condition in which the plates become generally parallel to the axis of the tubular body. Accordingly, the vehicle-cabin air outlet device allows the vehicle occupant to adjust the wind direction to a desired direction by use of the wind-direction adjustment plates; i.e., by rotating the wind-direction adjustment plates and adequately adjusting the amount of rotation.

As described above, in the vehicle-cabin air outlet device, through adjustment of the wind-direction adjustment plates; i.e., through adequate adjustment of the rotational amount of all the wind-direction adjustment plates in the parallel condition, the outlet opening at the front end of the tubular body can be opened, and the wind direction; i.e., the flow direction of air (wind) blown out of the outlet opening, can be adjusted. However, in this case, a clearance is naturally formed between the inner wall surface of the tubular body and the tip end edge of a wind-direction adjustment plate located on one side, and airflow comes out from the clearance. The airflow, which is influenced by the inner wall surface of the tubular body, goes straight and parallel to the axis of the tubular body, and changes the wind direction adjusted by the action of the wind-direction adjustment plates. That is, the airflow going straight out of the opening at the front end of the tubular body prevents the flow of air produced by means of the wind-direction adjustment plates. In such a case, the adjusted wind direction is changed from the wind direction desired by the vehicle occupant.

In the vehicle-cabin air outlet device, the above-mentioned clearance is unavoidably formed as a result of rotation of the wind-direction adjustment plates, and gradually increases with rotation of the wind-direction adjustment plates. Since the tip end edge of the wind-direction adjustment plate located on one side gradually separates apart from the inner wall surface of the tubular body when it rotates so as to open the outlet opening of the tubular body, formation of the above-mentioned clearance is unavoidable.

SUMMARY OF THE INVENTION

An object of the present invention is to provide a vehicle-cabin air outlet device which employs, in addition to the above-described wind-direction adjustment plates (directional vanes), a secondary wind-direction adjustment plate (a secondary directional vane) capable of, when necessary, closing the above-mentioned clearance to a possible degree, to thereby solve the problem of the conventional vehicle-cabin air outlet device.

The invention is a vehicle-cabin air outlet device. The present invention is based on the vehicle-cabin air outlet device, comprising a tubular body which forms an air guide passage; a plurality of wind-direction adjustment plates which are rotatably supported within the tubular body and are adapted to open and close an outlet opening of the tubular body, the outlet opening being provided at a front end of the tubular body; and a connection member which connects the wind-direction adjustment plates together and rotates the wind-direction adjustment plates in an interlocked manner, wherein the wind-direction adjustment plates are rotated and adjusted between a parallel condition in which the wind-direction adjustment plates are arranged generally parallel to the axis of the tubular body and a series condition in which the wind-direction adjustment plates are arranged generally perpendicular to the axis of the tubular body, to thereby provide a wind distribution function of opening the outlet opening of the tubular body and adjusting the flow direction of blown air, and a wind shutoff function of closing the outlet opening of the tubular body to thereby stop the blowing of air.

In the present embodiment, the wind-direction adjustment plates are referred to as "primary wind-direction adjustment plates (primary directional vanes)". In the vehicle-cabin air outlet device according to the present invention, one of the primary wind-direction adjustment plates is configured such that its tip end edge gradually separates from an inner wall surface of the tubular body when the primary wind-direction adjustment plates are rotated so as to open the outlet opening in a closed condition, and a secondary wind-direction adjustment plate is secured to the back of the certain primary wind-direction adjustment plate with a predetermined spacing formed therebetween, wherein the secondary wind-direction adjustment plate rotates, together with the certain primary wind-direction adjustment plate, about the rotation center of the certain primary wind-direction adjustment plate.

In the vehicle-cabin air outlet device according to the present invention, the secondary wind-direction adjustment plate may be configured such that during rotation of the primary wind-direction adjustment plates from the series condition in which the primary wind-direction adjustment plates are arranged generally perpendicular to the axis of the tubular body to thereby shut off air flow to the parallel condition in which the primary wind-direction adjustment plates are arranged generally parallel to the axis of the tubular body, the secondary wind-direction adjustment plate functions to close the clearance formed between the inner wall surface of the tubular body and the tip end edge of the certain primary wind-direction adjustment plate to which the secondary wind-direction adjustment plate is secured.

In the vehicle-cabin air outlet device according to the present invention, preferably, the primary and secondary wind-direction adjustment plates are supported within the tubular body so as to constitute a cylindrical inner register, which is fitted into a cylindrical retainer such that the inner register can be rotated stepwise in the circumferential direction, wherein through positional adjustment of the inner register performed by rotating the inner register stepwise within the retainer, air from the inner register can be selectively directed to an upward direction, a downward direction, a rightward direction, or a leftward direction.

In the vehicle-cabin air outlet device according to the present invention, like a conventional vehicle-cabin air outlet device of this type, when the primary wind-direction adjustment plates are in a series condition where the primary wind-direction adjustment plates are arranged generally perpendicular to the axis of the tubular body, the primary wind-direction adjustment plates close the outlet opening, which is a front-end-side opening portion of the tubular body, to thereby provide a wind shutoff function. When one of the primary wind-direction adjustment plates in this condition is pushed and moved toward the interior of the tubular body, all the primary wind-direction adjustment plates gradually rotate in parallel in an interlocked manner, and at the rotation limit, enter a parallel condition where the primary wind-direction adjustment plates are arranged generally parallel to the axis of the tubular body. By means of properly adjusting the rotation position of the parallel primary wind-direction adjustment plates between the two conditions, the direction of air (wind) blown out of the outlet opening of the tubular body can be directed to a direction desired by a vehicle occupant. In other words, the primary wind-direction adjustment plates provide a wind distribution function.

When the primary wind-direction adjustment plates are in the series condition and close the outlet opening, the secondary wind-direction adjustment plate of the vehicle-cabin air outlet device according to the present invention is located on the back side of the certain primary wind-direction adjustment plate to which the secondary wind-direction adjustment plate is secured, such that the secondary wind-direction adjustment plate is parallel to the certain primary wind-direction adjustment plate with a predetermined spacing therebetween. When primary wind-direction adjustment plates are rotated, the secondary wind-direction adjustment plate rotates, together with the certain primary wind-direction adjustment plate, about the rotation center of the certain primary wind-direction adjustment plate while maintaining the state of being parallel to the certain primary wind-direction adjustment plate. As a result, on the back side of the certain primary wind-direction adjustment plate, like the certain primary wind-direction adjustment plate, the tip end edge of the secondary wind-direction adjustment plate gradually separates away from the inner wall surface of the tubular body as the secondary wind-direction adjustment plate rotates, whereby a clearance is gradually formed between the tip end edge and the inner wall surface of the tubular body. This clearance increases with rotation amount of the secondary wind-direction adjustment plate.

As described above, when primary wind-direction adjustment plates are rotated, the secondary wind-direction adjustment plate rotates about the rotation center of the certain primary wind-direction adjustment plate, on the back side of the certain primary wind-direction adjustment plate, while maintaining the state of being parallel to the certain primary wind-direction adjustment plate. As a result, like the certain primary wind-direction adjustment plate, the tip end edge of the secondary wind-direction adjustment plate gradually separates away from the inner wall surface of the tubular body as the secondary wind-direction adjustment plate rotates, whereby a clearance is formed between the tip end edge and the inner wall surface.

However, the secondary wind-direction adjustment plate is provided on the back side of the certain primary wind-direction adjustment plate with a predetermined spacing therebetween, and rotates, together with the certain primary wind-direction adjustment plate, about the rotation center of the certain primary wind-direction adjustment plate. Therefore, when the secondary wind-direction adjustment plate is rotated by the same amount (same angle) as the certain primary wind-direction adjustment plate, the amount by which the tip end edge of the secondary wind-direction adjustment plate separates away from the inner wall surface of the tubular body (the clearance formed therebetween) becomes smaller than the amount by which the tip end edge of the certain primary wind-direction adjustment plate separates away from the inner wall surface of the tubular body (the clearance formed therebetween).

Therefore, the secondary wind-direction adjustment plate functions to close the clearance, which is formed between the tip end edge of the certain primary wind-direction adjustment plate and the inner wall surface of the tubular body, until the primary wind-direction adjustment plates become parallel to the axis of the tubular body. The function of the secondary wind-direction adjustment plate to close the clearance formed by the certain primary wind-direction adjustment plate is maximally provided at the beginning of rotation of the primary wind-direction adjustment plates; i.e., when their rotation amounts are small so that the secondary wind-direction adjustment plate closes the clearance substantially completely. The function of closing the clearance gradually lowers as the rotation amount of the primary wind-direction adjustment plates increases.

The clearance formed by the primary wind-direction adjustment plates causes the air (wind) blown from the outlet opening of the tubular body to flow straight, and the straight air flow collides with the air flow produced by the primary wind-direction adjustment plates. As a result, the straight air flow greatly hinders the air flow toward the adjusted direction, and greatly changes the adjusted wind direction. However, in the vehicle-cabin air outlet device according to the present invention, as described above, the secondary wind-direction adjustment plate closes the clearance in accordance with the rotation amount of the certain primary wind-direction adjustment plate. Specifically, when the rotational amount of the primary wind-direction adjustment plates is small and the wind direction is adjusted to a large angle with the axis of the tubular body, the secondary wind-direction adjustment plate functions to close the clearance to a large degree; and when the rotational amount of the primary wind-direction adjustment plates is large and the wind direction is adjusted to a small angle with the axis of the tubular body, the secondary wind-direction adjustment plate functions to close the clearance to a small degree. Therefore, the flow of air blown out through the clearance is restricted in accordance with the rotation amount of the primary wind-direction adjustment plates, and change in the wind direction directed by the primary wind-direction adjustment plates can be greatly suppressed. In addition, when the secondary wind-direction adjustment plate is rotated by a large amount, due to a drop of the above-mentioned clearance closing function, the secondary wind-direction adjustment plate provides the wind distribution function as in the case of the primary wind-direction adjustment plates.

In the vehicle-cabin air outlet device according to the present invention, the primary and secondary wind-direction adjustment plates may be supported within the tubular body so as to constitute a cylindrical inner register, which is fitted into a cylindrical retainer such that the inner register can be rotated stepwise in the circumferential direction. In the vehicle-cabin air outlet device according to this configuration, through positional adjustment of the inner register performed by rotating the inner register stepwise within the retainer, air from the inner register can be selectively directed to an upward direction, a downward direction, a rightward direction, or a leftward direction.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Figure 1:
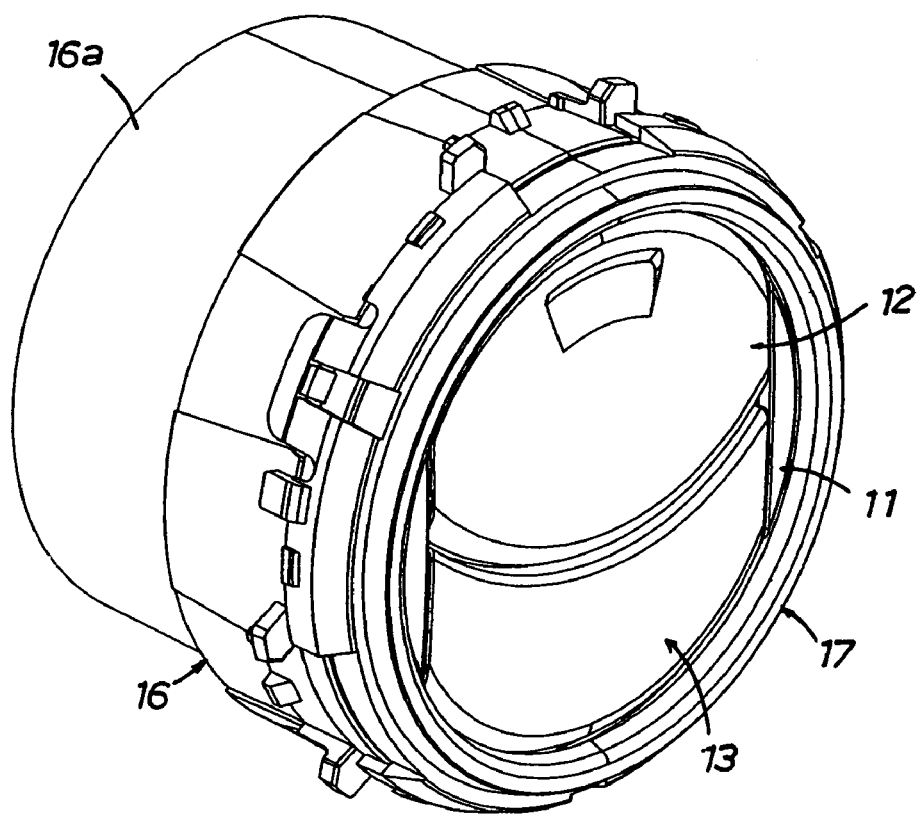
FIG. 1 is a perspective view of a register which is one embodiment of the air outlet device according to the present invention.
Figure 2:
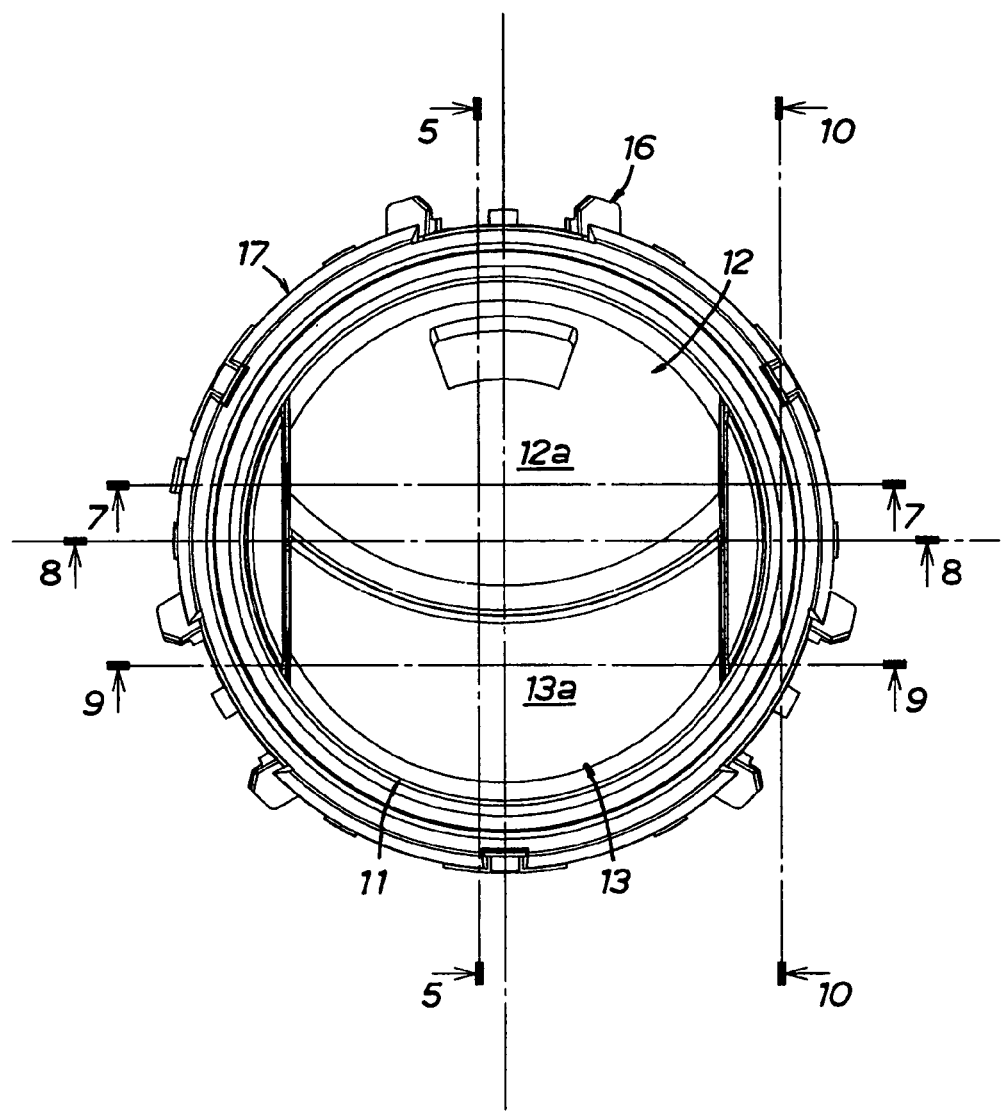
FIG. 2 is a front view of the register.
Figure 3:
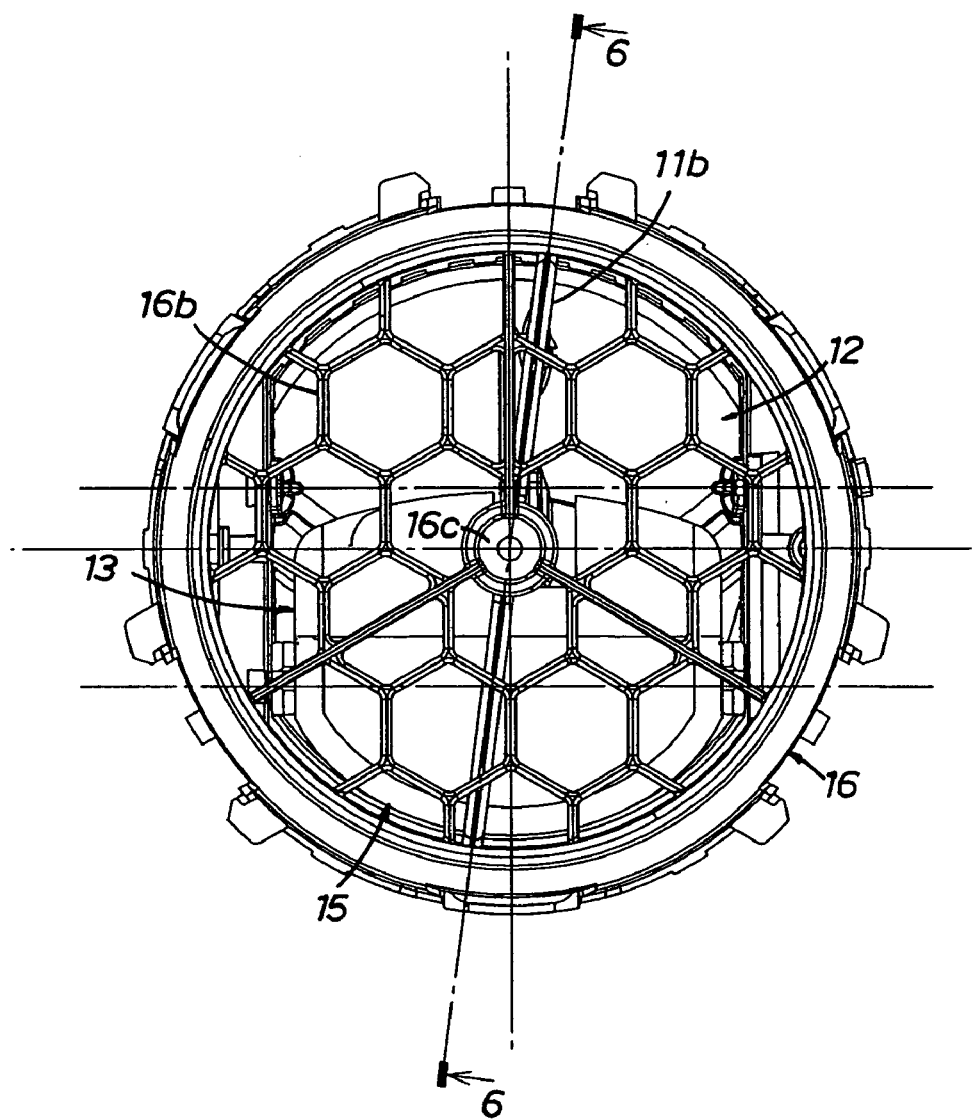
FIG. 3 is a rear view of the register.
Figure 4:
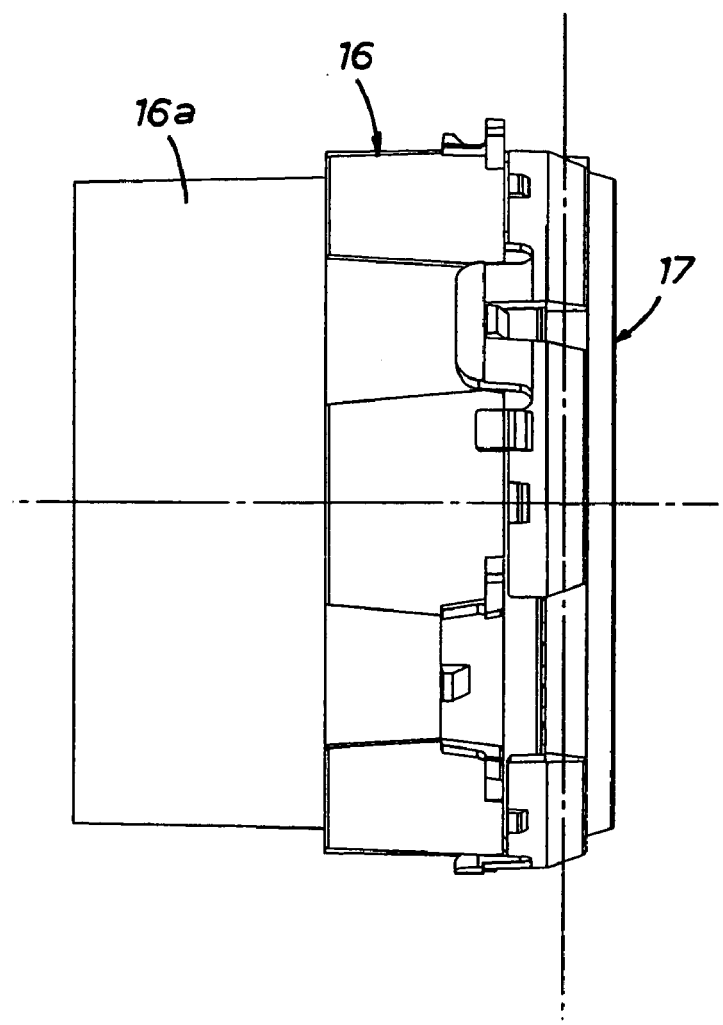
FIG. 4 is a side view of the register.

The present invention relates to a vehicle-cabin air outlet device which is installed on, for example, an instrument panel of a vehicle cabin and functions as a center register, side register, lower register, side defroster, or the like. FIGS. 1 to 4 show a register which is an embodiment of the air outlet device according to the present invention. FIG. 1 is a perspective view of the register; FIG. 2 is a front view of the register; FIG. 3 is a rear view of the register; and FIG. 4 is a side view of the register. FIGS. 5 to 10 are sectional views of the register taken at different locations and along different directions.

The register includes a case (tubular body) 11; first and second fins (two primary wind-direction adjustment plates) 12 and 13; a connection rod 14 for connecting these fins 12 and 13 together; and a third fin (single secondary wind-direction adjustment plate) 15. The register further includes a cylindrical retainer 16 for fitting the case 11, and an annular cover 17 fitted to a front end portion of the case 11.

The case 11 is mainly formed by a cylindrical, tubular case body 11a having a predetermined length. A front-end-side opening portion of the case body 11a serves as an air outlet opening, and a rear-end-side opening portion of the case body 11a serves as an air inlet opening. Arcuate support arms 11b extend from the edge portion of the rear-end-side opening portion of the case body 11a; and central portions of the support arms 11b with respect to the longitudinal direction thereof; i.e., portions of the support arms 11b located at the center axis of the case body 11a, are formed into a support portion 11c. An insertion hole 11d is formed in the support portion 11c such that the insertion hole 11d opens rearward (see FIGS. 5 and 6).

The first fin 12 has a generally elliptical peripheral shape and assumes the form of a flat plate. The first fin 12 includes a fin body 12a which assumes the form of a generally elliptical flat plate; a connection arm 12b projecting from the rear surface of the fin body 12a at a position above the central portion of the fin body 12a; and left-hand and right-hand support shafts 12c which project from the peripheral edge of the fin body 12a at left and right end portions thereof, which are located on the opposite sides with respect to the major axis of the elliptical peripheral shape (see FIGS. 5 to 7).

Like the first fin 12, the second fin 13 has a generally elliptical peripheral shape and assumes the form of a flat plate. The second fin 13 includes a stepped fin body 13a which assumes the form of a generally elliptical flat plate; a connection am 13b projecting from the rear surface of the fin body 13a at a position above the central portion of the fin body 13a; and left-hand and right-hand support shafts 13c which project from the peripheral edge of the fin body 13a at left and right end portions thereof, which are located on the opposite sides with respect to the major axis of the elliptical peripheral shape. A recess portion 13a1 recessed toward the rear side is formed on the front surface of the fin body 13a of the second fin 13 on the upper side in FIG. 5. The recess portion 13a1 is formed into such a shape that the rear surface of the lower portion (in FIG. 5) of the fin body 12a of the first fin 12 fits into the recess portion 13a1 while overlapping therewith (see FIGS. 5, 8, and 9).

The right-hand support shafts 12c and 13c of the first and second fins 12 and 13 are rotatably supported in respective support holes formed to the inner surface of the case 11. The left-hand support shafts 12c and 13c of the first and second fins 12 and 13 are rotatably supported by means of supports 18a, which are fitted into fitting recesses 11e formed to the inner surface of the case 11. The connections arms 12b and 13b of the first fin 12 and the second fin 13 are connected together via the connection rod 14, so that the first fin 12 and the second fin 13 rotate in an interlocked manner. The first and second fins 12 and 13 supported as described above can partially fit and overlap each other at their lower and upper sides, respectively, in FIG. 5.

Like the first and second fins 12 and 13, the third fin 15, which serves as the secondary wind-direction adjustment plate in the present invention, has a generally elliptical peripheral shape and assumes the form of a flat plate. The third fin 15 includes a fin body 15a which assumes the form of a generally elliptical flat plate; and fixation arms 15b and 15c which project perpendicularly from the front surface of the fin body 15a at the left-hand and right-hand end portions thereof. The fixation arms 15b and 15c are secured to the second fin 13 by their tip end portions being fixed to the inner surfaces of left-hand and right-hand outer flanges of the second fin 13. The third fin 15 is fixed to the second fin 13 in the above-mentioned manner and disposed within the case 11 together with the second fin 13. In this fixation state, the third fin 15 is maintained parallel to the rear surface of the second fin 13 and is separated therefrom by a predetermined distance. The third fin 15 rotates, together with the second fin 13, about the same rotation center as that of the second fin 13 by the same angle as the second fin 13 (see FIGS. 5, 6, 8, and 9).

The case 11 with the first, second, and third fins 12, 13, and 15 disposed herein functions as a register. In the present invention, this register is called an "inner register." The inner register is fitted into the cylindrical body 16a of the retainer 16 for assembly, and the annular cover 17 is fitted onto the outer circumferential edge of the front-end-side opening portion of the case body 11a. The cover 17 converts the front-end-side opening portion of the case body 11a to an air outlet opening. That is, the cover 17 forms the air outlet opening of the register.

The retainer 16 is mainly formed by a cylindrical retainer body 16a. The front-end-side opening portion of the retainer body 16a is fully opened, and the case 11 can be fitted into the interior of the retainer body 16a. The rear-end-side opening portion of the retainer body 16a is covered with a coarse honeycomb net member 16b. A support portion 16c is formed at a central portion of the net member 16b. The support portion 16c has a projection 16d which projects frontward. When the case 11 is fitted into the interior of the retainer body 16a, the projection 16d is inserted into the insertion hole 11d of the support portion 11c of the case 11, whereby the case 11 is supported to be rotatable in the circumferential direction (see FIGS. 5, 6, and 8). Further, the retainer body 16a has a stepped portion 16e formed on the inner wall surface thereof at an intermediate portion with respect to the longitudinal direction thereof. The stepped portion 16e is formed to have a continuous, uneven front-side end surface over the entire circumference thereof. When the case 11 is fitted into the interior of the retainer body 16a, the end surface of the stepped portion 16e elastically bears and supports leg portions of a spring 18b assembled to the rear end surface of the case body 11a, and permits stepwise rotation of the case 11 in the circumferential direction (see FIG. 10).

The register according to the present invention is assembled to, for example, an instrument panel within the vehicle cabin, and is connected, at the rear-end-side opening portion of the retainer body 16a, to a distal end portion of an air guide duct of an air conditioner, the distal end portion facing the instrument panel. In such an assembled condition, the register is positioned such that the cover 17, the front end of the case 11, the first fin 12, and the second fin 13 are exposed to the interior of the vehicle cabin. Depending on the disposed position, the register functions as a center register, a side register, a lower register, a side defroster, or the like.

As in the case of a conventional register of this type, through adjustment of rotational amounts of the fins 12, 13, and 15, the register of the present invention can provide a wind shutoff function of closing the front-end-side opening portion of the case body 11a of the case 11 (the air outlet opening of the register) to thereby stop the blowing of air from the air outlet opening (see FIG. 11), and a wind distribution function of opening the air outlet opening and directing the flow of air blown from the air outlet opening to a desired direction (see FIGS. 12 and 13).

Figure 5:
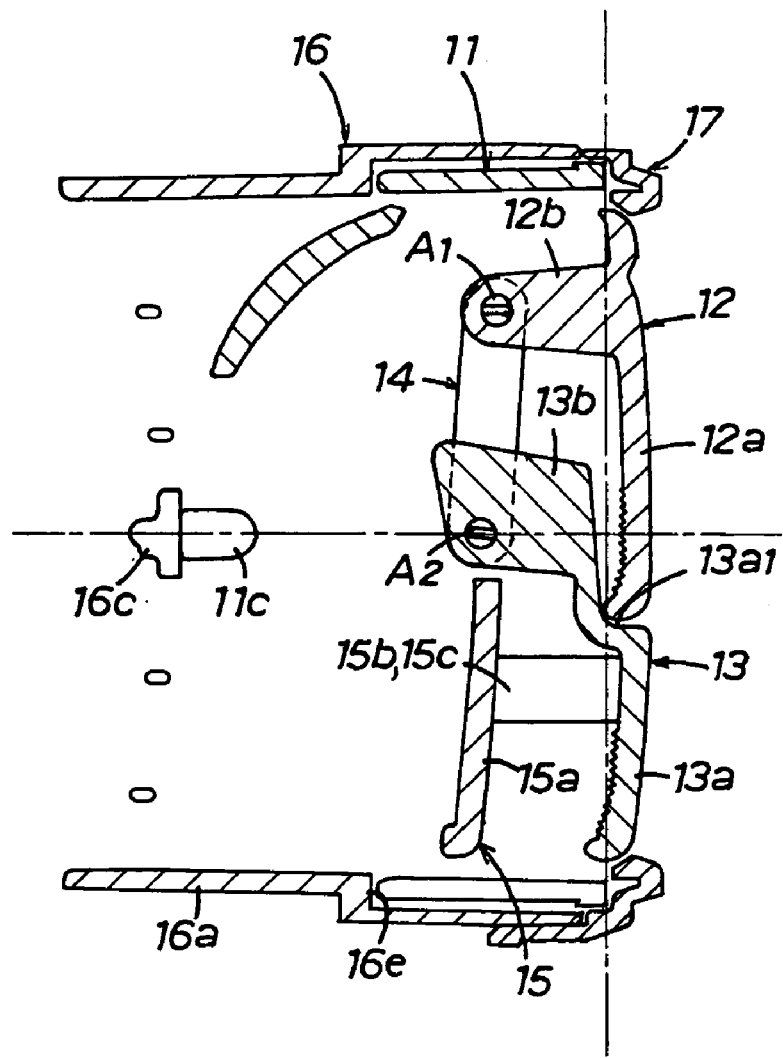
FIG. 5 is a sectional view of the register taken along line 5-5 in FIG. 2.
Figure 6:
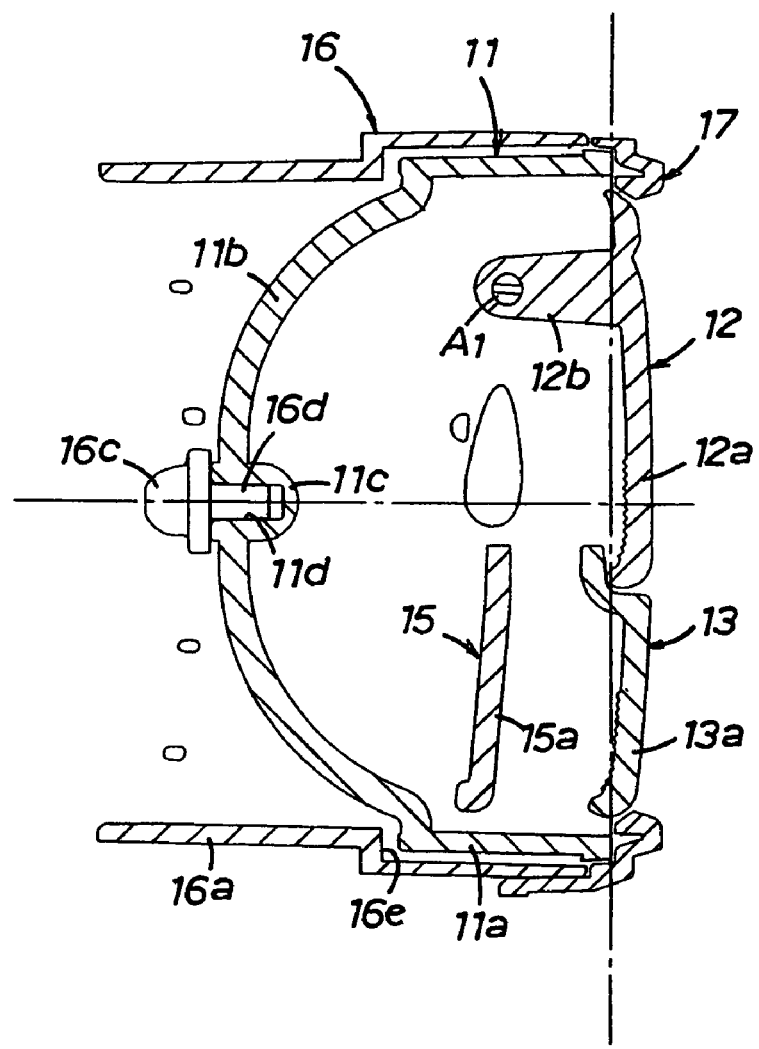
FIG. 6 is a sectional view of the register taken along line 6-6 in FIG. 3.
Figure 7:
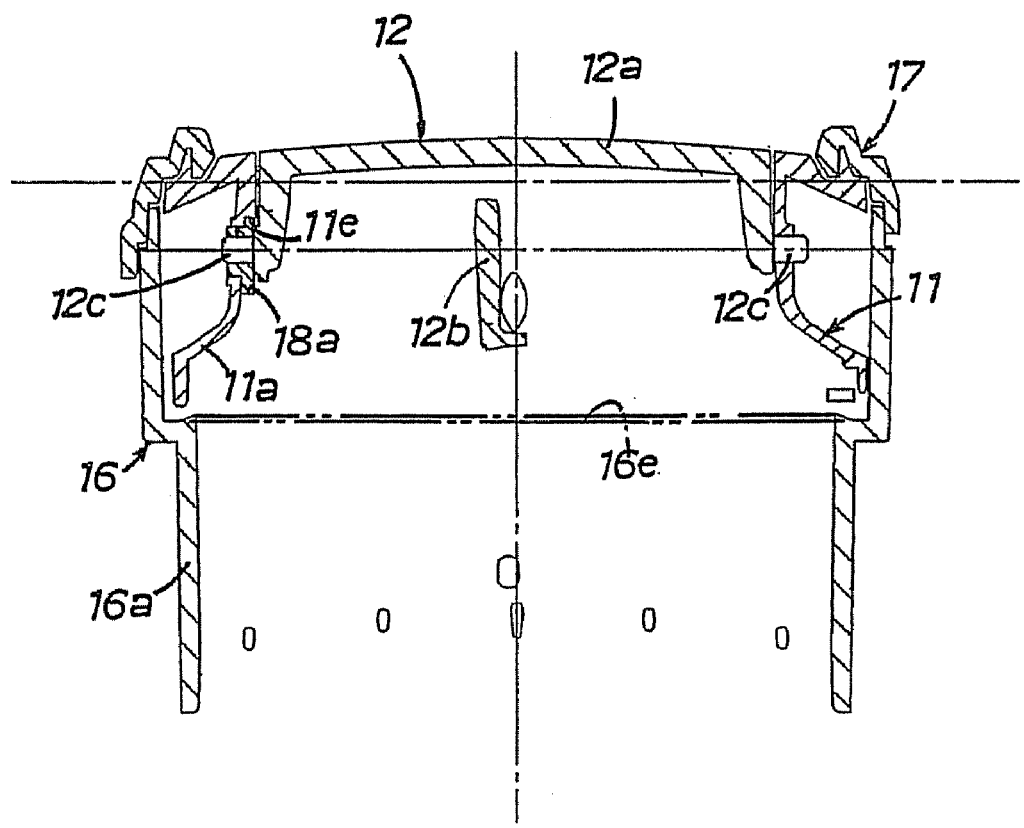
FIG. 7 is a sectional view of the register taken along line 7-7 in FIG. 2.
Figure 8:
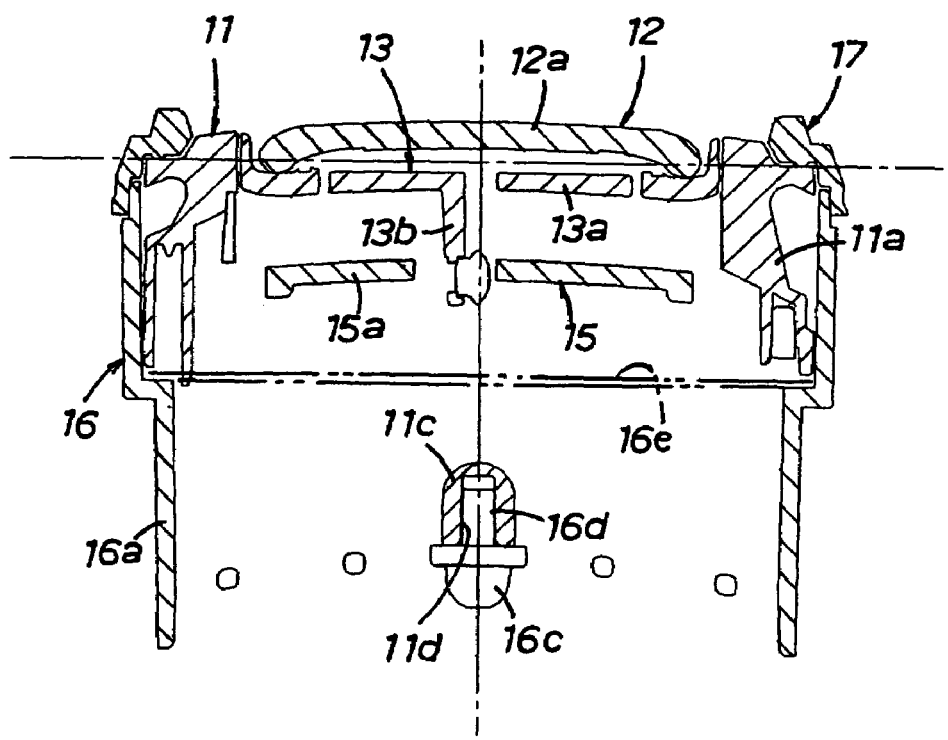
FIG. 8 is a sectional view of the register taken along line 8 in FIG. 2.
Figure 9:
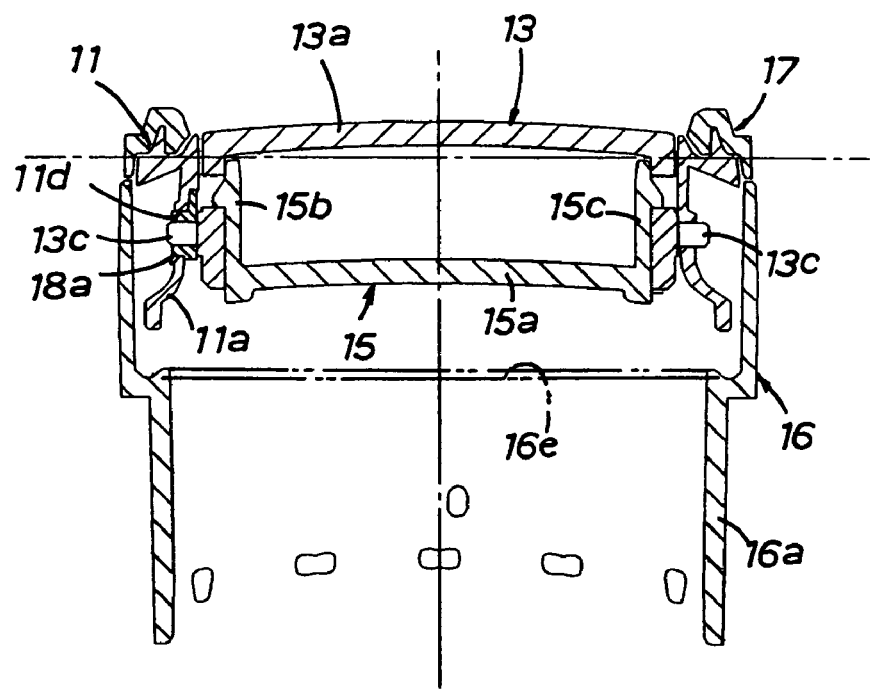
FIG. 9 is a sectional view of the register taken along line 9-9 in FIG. 2.
Figure 10:
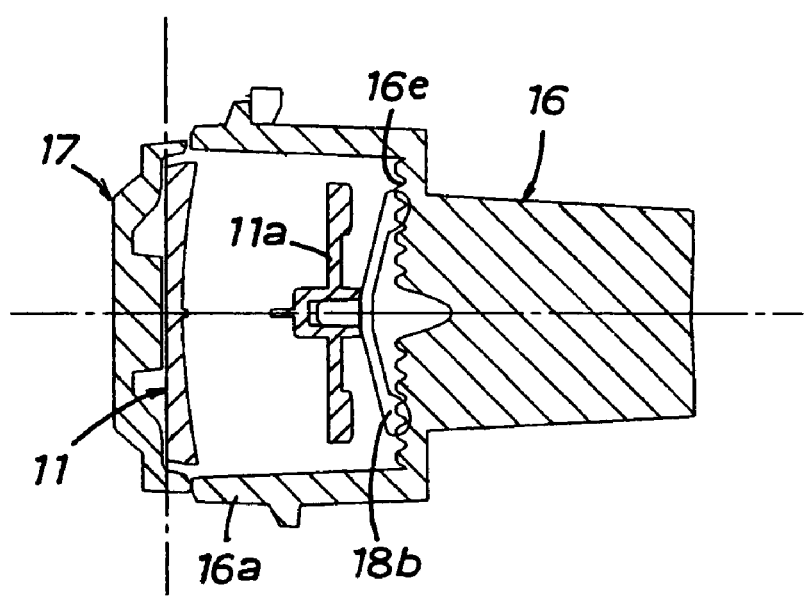
FIG. 10 is a sectional view of the register taken along line 10-10 in FIG. 2.
Figure 11B:
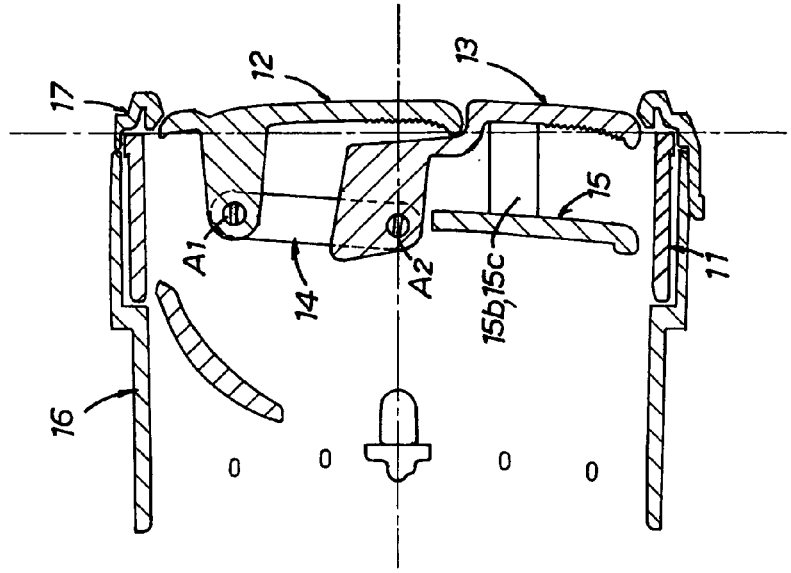
FIG. 11B is a sectional view of the register corresponding to FIG. 5 in the condition where the outlet opening of the register is closed.
Figure 11A:
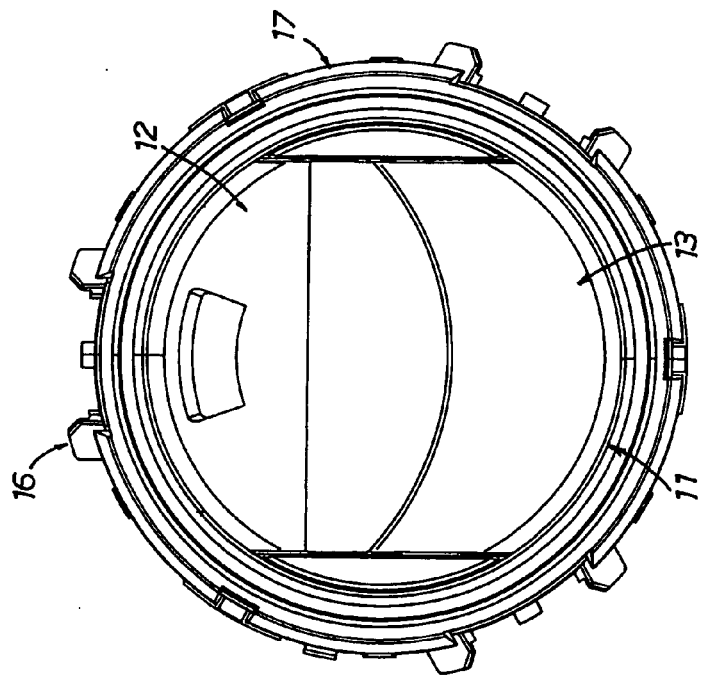
FIG. 11A is a front view of the register in a condition where the outlet opening of the register is closed.
Figure 12B:
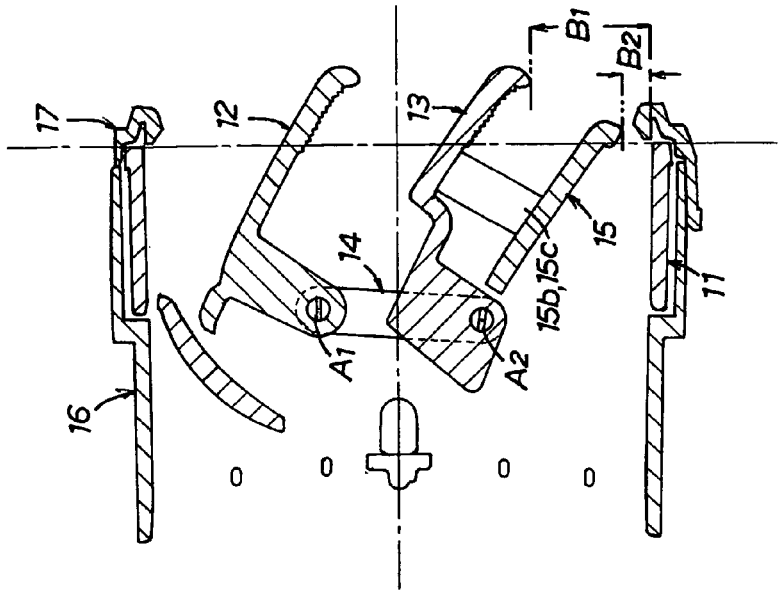
FIG. 12B is a sectional view of the register corresponding to FIG. 5 in the condition where the outlet opening of the register is opened half.
Figure 12A:
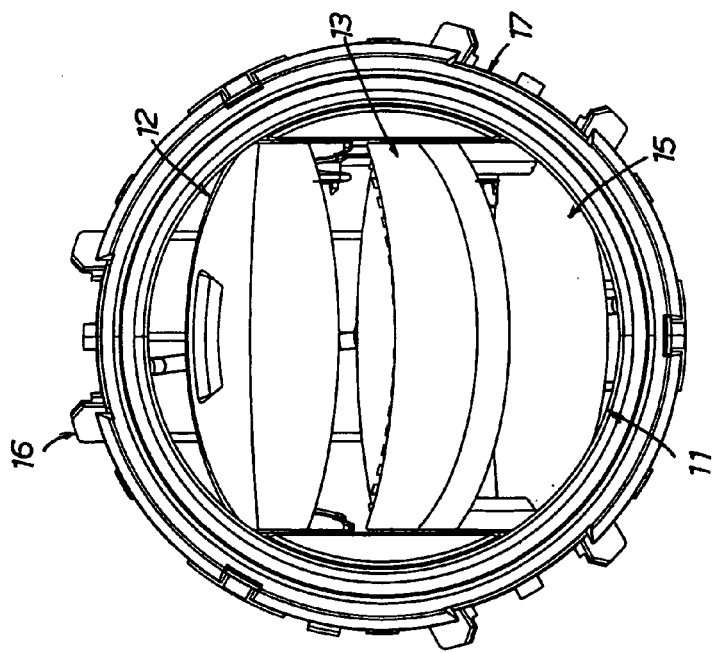
FIG. 12A is a front view of the register in a condition where the outlet opening of the register is opened half.
Figure 13B:
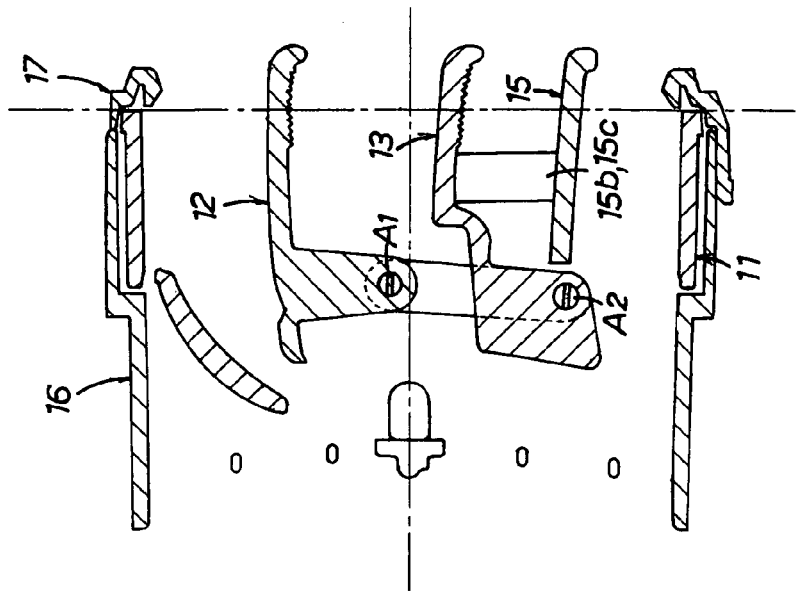
FIG. 13B is a sectional view of the register corresponding to FIG. 5 in the condition where the outlet opening of the register is completely opened.
Figure 13A:
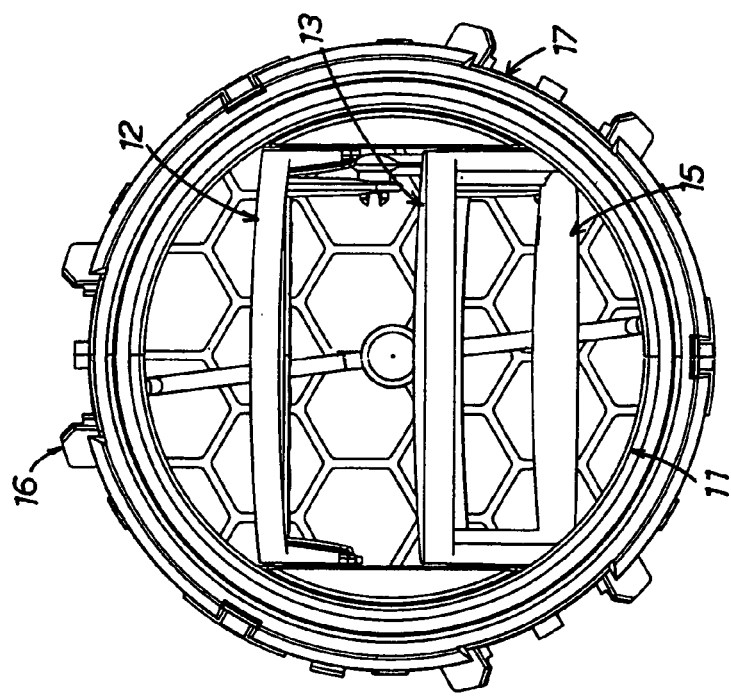
FIG. 13A is a front view of the register in a condition where the outlet opening of the register is completely opened.

FIGS. 11A and 11B show a condition in which the air outlet opening of the register is closed by means of the fins 12, 13, and 15, wherein FIG. 11A is a front view of the register, and FIG. 11B is a vertical sectional view of the register corresponding to FIG. 5. FIGS. 13A and 13B show a condition in which the air outlet opening of the register is completely opened by means of the fins 12, 13, and 15, wherein FIG. 13A is a front view of the register, and FIG. 13B is a vertical sectional view of the register corresponding to FIG. 5. FIGS. 12A and 12B show a condition in which the air outlet opening of the register is half opened by means of the fins 12, 13, and 15, wherein FIG. 12A is a front view of the register, and FIG. 12B is a vertical sectional view of the register corresponding to FIG. 5.

In the register, as shown in FIGS. 11A and 11B, the first and second fins 12 and 13 (primary wind-direction adjustment plates according to the present invention) can be rotated to a condition where the first and second fins 12 and 13 are arranged in series and generally perpendicular to the axis of the case 11, to thereby close the front-end-side opening portion (the air outlet opening) of the case body 11a. In such a rotated position, the first and second fins 12 and 13 provide a wind shutoff function of shutting off the flow of air fed through the interiors of the retainer 16 and the case 11. In the condition where the first and second fins 12 and 13 shut off the air flow, the third fin 15 (secondary wind-direction adjustment plate according to the present invention) is located on the back side of the second fin 13, and is parallel to the second fin 13 with a predetermined spacing formed therebetween.

In the wind shutoff condition created by the first and second fins 12 and 13, either of the first and second fins 12 and 13 can be pushed and moved toward the interior of the case body 11a of the case 11. Upon being pushed, the first and second fins 12 and 13 gradually rotate in an interlocked manner to become parallel to the axis of the case 11 to thereby gradually open the air outlet opening. When the first and second fins 12 and 13 are rotated to the rotation limit, the first and second fins 12 and 13 enter a full open condition where the first and second fins 12 and 13 become generally parallel to the axis of the case 11 (see FIGS. 13A and 13B). In the middle of rotation to the limit, the first and second fins 12 and 13 are in a half opened condition where the first and second fins 12 and 13 incline with respect to the axis of the case 11 (see FIGS. 12A and 12B). During the course of rotation of the first and second fins 12 and 13, the third fin 15, which is located on the back side of the second fin 13, is parallel to the second fin 13 with the predetermined spacing formed therebetween.

In the wind shutoff condition created by the first and second fins 12 and 13, the air outlet opening of the register is completely closed. When the first and second fins 12 and 13 are gradually rotated from the closing position, the air outlet opening of the register is gradually opened, so that a flow of air (wind) can be provided. When the first and second fins 12 and 13 reach the rotation limit, the air outlet opening of the register is completely opened. In an intermediate position therebetween, due to the inclined conditions of the first, second, and third fins 12, 13, and 15, the flow of air (wind) from the air outlet opening of the register is adjusted in terms of wind direction and wind quantity. Therefore, a vehicle occupant can adjust the flow of air from the air outlet opening of the register, by properly rotating the first, second, and third fins 12, 13, and 15, such that a desired wind direction and a desired wind quantity are attained.

In the register, when the first and second fins (primary wind-direction adjustment plates) 12 and 13 are rotated toward the opening direction from the closing position where the first and second fins 12 and 13 completely close the air outlet opening of the register, the first fin 12 rotates about the support shafts 12c, and the second fin 13 rotates about the support shafts 13c. Hereinbelow, the rotation center of the first fin 12, which rotates about the support shafts 12c, and the rotation center of the second fin 13, which rotates about the support shafts 13c, will be referred to as the rotation center A1 and the rotation center A2, respectively; and these rotation centers A1 and A2 are shown in the relevant drawings.

When the first fin 12 rotates about the rotation center A1 and the second fin 13 rotates about the rotation center A2 accordingly, the tip end edge of the second fin 13 gradually separates away from the inner wall surface of the case body 11a of the case 11 with rotation of the second fin 13, and a clearance B1 is formed between the tip end edge and the inner wall surface of the case body 11a. This clearance B1 enables air within the case body 11a to flow out of the air outlet opening of the register. Due to the wind-direction adjustment function caused by the inner wall surface of the case body 11a, the air might form a straight air flow parallel to the axis of the case body 11a, without being influenced by the wind-direction adjustment function provided on the back side of the second fin 13. The straight air flow might collide with the air flow produced by the first and second fins 12 and 13, and greatly hinder the produced air flow, raising a problem of the adjusted wind direction being greatly changed. Accordingly, a register of such a type is required to suppress generation of a straight flow of air blown out through the clearance B1. In order to meet such a demand, the register of the present embodiment includes the third fin 15, which serves as the secondary wind-direction adjustment plate.

When the first and second fins 12 and 13 are arranged in series and generally perpendicular to the axis of the case body 11a, to thereby close the air outlet opening of the register, the third fin 15 is located on the back side of the second fin 13, to which the third fin 15 is secured, such that the third fin 15 is parallel to the second fin 13 with a predetermined spacing therebetween. Therefore, when the first and second fins 12 and 13 are rotated, the third fin 15 rotates, together with the second fin 13, about the rotation center A2 of the second fin 13 while maintaining the state of being parallel to the fin 13. As a result, like the second fin 13, the tip end edge of the third fin 15 gradually separates away from the inner wall surface of the case body 11a as the third fin 15 rotates, whereby a clearance B2 is formed between the tip end edge of the third fin 15 and the inner wall surface of the case body 11a.

Since the third fin 15 is held on the back side of the second fin 13 with a predetermined spacing therebetween, when the third fin 15 is rotated by the same amount (same angle) as the second fin 13, the clearance B2, which is formed between the tip end edge of the third fin 15 and the inner wall surface of the case body 11a, becomes very small as compared with the clearance B1, which is formed between the tip end edge of the second fin 13 and the inner wall surface of the case body 11a (see FIG. 12B).

Therefore, the third fin 15 functions to close the clearance B1, which is formed between the tip end edge of the second fin 13 and the inner wall surface of the case body 11a, until the first and second fins 12 and 13 become parallel to the axis of the case body 11a of the case 11. The function of the third fin 15 to close the clearance B1 is maximally provided at the beginning of rotation of the first and second fins 12 and 13; i.e., when their rotation amounts are small (the rotation angles are small), so that the third fin 15 closes the clearance B1 substantially completely. The function of closing the clearance B1 gradually lowers as the rotation amount (rotation angle) of the first and second fins 12 and 13 increases.

By the action of the inner wall surface of the case body 11a, the clearance B1, formed between the tip end edge of the second fin 13 and the inner wall surface of the case body 11a, might cause the air (wind) blown from the air outlet opening to advance straight ahead, so that the air flow collides with the air flow toward the desired direction produced by the first and second fins 12 and 13. As a result, the air flow from the clearance B1 might greatly hinder the air flow toward the desired direction, and greatly change the adjusted wind direction.

However, in the register of the present embodiment, as described above, the third fin 15 functions in accordance with the rotation amount of the first and second fins 12 and 13 such that the third fin 15 closes the clearance B1 to a large degree when the rotational angle is small; i.e., the wind direction is adjusted to a large degree, and closes the clearance B1 to a small degree when the rotational angle is large; i.e., the wind direction is adjusted to a small degree. Therefore, the flow of air blown out through the clearance B1 is restricted in accordance with the rotation amount of the first and second fins 12 and 13, and change in the wind direction directed by the first and second fins 12 and 13 can be greatly suppressed. In addition, when the third fin 15 is rotated by a large amount, the third fin 15 provides not only the above-described function, but also the wind distribution function as in the case of the first and second fins 12 and 13.

In the register of present embodiment, the fins 12, 13, and 15 are supported on the case 11 so as to constitute an inner register, which is then fitted into the interior of the retainer 16 in such a manner that the case 11 can be rotated stepwise in the circumferential direction. Therefore, through positional adjustment of the case 11 performed by properly rotating the case 11 stepwise within the retainer 16, the vehicle occupant can adjust wind distribution such that the air blown out of the outlet opening of the inner register is selectively directed to various directions such as an upward direction, a downward direction, a rightward direction, and a leftward direction.

What is claimed is:

1. An air outlet device for a vehicle cabin, comprising:
   a tubular body which forms an air guide passage;
   a plurality of primary wind-direction adjustment plates each having a separate axis of rotation which are rotatably supported within the tubular body and are adapted to open and close an outlet opening of the tubular body, the outlet opening being provided at a front end of the tubular body, wherein one of the primary wind-direction adjustment plates is configured such that its tip end edge gradually separates from an inner wall surface of the tubular body when the primary wind-direction adjustment plates are rotated so as to open the outlet opening from a closed condition;
   a connection member which connects the primary wind-direction adjustment plates together and rotates the primary wind-direction adjustment plates in an interlocked manner; and a secondary wind-direction adjustment plate which is fixedly secured substantially parallel to a wind upstream surface of said one primary wind-direction adjustment plate with a predetermined spacing formed therebetween, wherein said secondary wind-direction adjustment plate is dimensioned so as not to contact the tubular body when the primary wind-direction adjustment plates are in each of a closed position, half-opened position, and a completely opened position.

2. An air outlet device for a vehicle cabin according to claim 1, wherein the secondary wind-direction adjustment plate is configured such that during rotation of the primary wind-direction adjustment plates from the series condition in which the primary wind-direction adjustment plates are arranged generally perpendicular to the axis of the tubular body to thereby shut off air flow to the parallel condition in which the primary wind-direction adjustment plates are arranged generally parallel to the axis of the tubular body, the secondary wind-direction adjustment plate functions to reduce the clearance formed between the inner wall surface of the tubular body and the tip end edge of the primary wind-direction adjustment plate to which the secondary wind-direction adjustment plate is secured.

3. An air outlet device for a vehicle cabin according to claim 1, wherein the air outlet device comprises a cylindrical inner register which is formed by the tubular body and the primary and secondary wind-direction adjustment plates supported within the tubular body; and a cylindrical retainer into which the inner register is fitted such that the inner register can be rotated stepwise in the circumferential direction, wherein through positional adjustment of the inner register performed by rotating the inner register stepwise within the retainer, air from the inner register can be selectively directed to an upward direction, a downward direction, a rightward direction, or a leftward direction.

* * * * *